United States Patent [19]

Opheij

[11] Patent Number: 4,460,990
[45] Date of Patent: Jul. 17, 1984

[54] APPARATUS FOR READING AN OPTICAL RECORD CARRIER

[75] Inventor: Willem G. Opheij, Eindhoven, Netherlands

[73] Assignee: U.S. Philips Corporation, New York, N.Y.

[21] Appl. No.: 339,934

[22] Filed: Jan. 18, 1982

[30] Foreign Application Priority Data

Nov. 2, 1981 [NL] Netherlands ............... 8104946

[51] Int. Cl.³ .............................................. G11B 7/12
[52] U.S. Cl. .................................... 369/112; 369/109; 369/118
[58] Field of Search ............... 346/762, 108; 350/162.11, 448; 369/45, 46, 44, 111, 109, 116, 118, 275, 100, 112; 358/342; 365/215; 250/570

[56] References Cited

U.S. PATENT DOCUMENTS

| | | | |
|---|---|---|---|
| 3,476,457 | 11/1969 | Nomarski | 350/448 |
| 3,843,235 | 10/1974 | Mino et al. | 350/448 |
| 3,913,076 | 10/1975 | Lehureau et al. | 369/118 |
| 4,171,879 | 10/1979 | Bricot et al. | 369/109 |
| 4,375,096 | 2/1983 | Gorog et al. | 369/118 |

OTHER PUBLICATIONS

Smith, Warren J., *Modern Optical Engineering* McGraw-Hill, New York, 1971, p. 323.

Primary Examiner—Donald E. McElheny, Jr.
Attorney, Agent, or Firm—Robert T. Mayer; Algy Tamoshunas

[57] ABSTRACT

An apparatus is described for reading an optical information structure arranged in tracks. By the use of a substantially rotationally symmetrical element having an annular radiation-attenuating peripheral portion cross-talk between the tracks as a result of obliquity of the information structure is substantially reduced.

4 Claims, 4 Drawing Figures

APPARATUS FOR READING AN OPTICAL RECORD CARRIER

BACKGROUND OF THE INVENTION

The invention relates to an apparatus for reading a record carrier having an optically readable trackwise arranged information structure, which apparatus comprises a radiation source, an objective system for focussing a beam emitted by the radiation source to form a circular radiation spot on the information structure, and a radiation-sensitive detection system.

A version of such apparatus, which version is specifically intended for reading an information structure in which a video programme has been stored, is known from, for example, "Philips' Technical Review" 33 (1973), no. 7, pages 178–180 and 186–189. In this apparatus a small radiation spot is formed at the information structure, the minimum dimension of said radiation spot being determined by the wavelength ($\lambda$) of the radiation beam and the numerical aperture (N.A.) of the objective system. The aberrations of said objective system are negligible and the intensity distribution within the radiation spot is not determined by the laws of the geometrical optics but solely by the diffraction at the aperture of the objective system. Even in the case of a uniform illumination of the objective system the intensity in the radiation spot is not uniform but exhibits a so-called Airy-distribution, comprising a bright central portion and a plurality of concentric rings of substantially lower intensity. For a satisfactory information density on the record carrier the information tracks should be arranged as close as possible to one another. Then, a part of the radiation may be incident on an adjacent information track even when the center of the radiation spot is located exactly in the center of an information track to be read. This part of the radiation is modulated by said adjacent track and may reach the detection system together with the central portion of the beam, which has been modulated by the information track to be read. Consequently, cross-talk between the information tracks may arise even in the case of correct tracking.

By a suitable choice of the distance between the information tracks, the wavelength of the radiation beam and the numerical aperture of the objective system, it is possible to maintain the cross-talk below a specific permissible level. However the intensity distribution within the radiation spot formed on the information structure depends not only on the quality of the optical system by means of which said radiation spot is formed but also on obliquity of the record carrier. The information structure is read through a transparent protective layer, which protective layer ensures that dust particles, scratches and the like on the record-carrier surface are situated outside the depth of focus of the objective system. If the radiation beam traverses said protective layer obliquely the intensity distribution within the radiation spot changes, mainly in the form of so-called third-order coma. The intensity in the rings increases, namely in the direction in which the record carrier surface is inclined. A certain obliquity of the record carrier in a radial direction, that is the direction transverse to the track direction, thus gives rise to increased cross-talk between the information track scanned by the radiation spot and the adjacent information track in whose direction the portion of the first ring which has an increased radiation intensity points.

The radiation source in an optical read apparatus may be a gas laser, such as a HeNe laser having a wavelength of 633 nm or a semiconductor diode laser, such as an AlGaAs laser having a wavelength of 790 nm. If in said apparatus the same optical bandwith, which is proportional to N.A./$\lambda$, as obtained with the gas laser is to be obtained with the diode laser, an objective system must be used for the diode laser, with a numerical aperture which is substantially greater (N.A. is for example 0.5) than that of the objective system used for a gas laser (N.A. is for example 0.4). Since the coma as a result of the obliquity of the record carrier is proportional to the third power of the numerical aperture, the use of a diode laser gives rise to a substantial increase in cross-talk between the information tracks in the case of obliquity of the record carrier. It has been found that when a HeNe laser is used the obliquity of the record carrier should be smaller than 1°. When an AlGaAs laser is used the obliquity should be less than 0.5°. In practice it is possible to meet the requirement that during reading the obliquity should not exceed 1°, but it is much more difficult to meet the requirement that the maximum obliquity should be 0.5°.

When a record carrier is read which contains a video programme in which the line-synchronising pulses of two adjacent tracks are offset relative to each other, said cross-talk manifests itself mainly in that said line-synchronising pulses become visible in and travel over the reproduced picture.

Obliquity in the radial direction, which is important in view of cross-talk between the information tracks, may be caused by a number of factors. The principal factors are: various tolerances during manufacture of the record carrier, incorrect positioning of the record carrier on the spindle by means of which the record carrier is rotated during reading, and in particular out-of-flatness of the record carrier under its own weight.

SUMMARY OF THE INVENTION

It is an object of the present invention to provide an apparatus of the type mentioned in the opening paragraph in which the cross-talk between the information tracks as a result of obliquity of the record carrier is substantially reduced. To this end the apparatus in accordance with the invention is characterized in that in the radiation path, at a location which is only traversed by the radiation beam emitted by the radiation source, there is arranged a substantially rotationally symmetrical radiation-attenuating element. The element comprises a central portion and an annular peripheral portion, between which portions an abrupt transition exists, the central portion of the element transmitting the central portion of the beam substantially unattenuated and the peripheral portion of the element providing a substantial attenuation of the amplitude of the peripheral portion of the beam.

The invention utilises the fact that in the case of an obliquity within specific limits the wavefront aberrations producing third-order coma are strongest at the edges of the pupil of the objective system. By attenuating the peripheral portions of the radiation beam the magnitude of the coma and thus the intensity in the ring of the read spot situated at the location of an adjacent information track can be reduced. This step may result in a slightly larger central portion of the read spot on the information structure, giving rise to a slight increase in cross-talk when the record-carrier surface is not in an oblique position. However, this effect is outweighed by the reduction of cross-talk caused by obliquity of the record-carrier.

It is to be noted that British Patent Specification No. 1,560,976 discloses a cross-talk reduction method in accordance with which the intensity distribution in the read spot and the distance between the information tracks are adapted to each other in such a way that the first dark ring of the "Airy" intensity distribution is situated exactly at the center of the information track adjacent the information track to be read. However, the radiation spot has a rectangular and not a circular shape. The arrangement in accordance with British Patent Specification No. 1,560,976 only provides cross-talk reduction as long as the record carrier is not in an oblique position. In the case of an oblique position the intensity around said first-mentioned dark ring increases and the cross-talk increases.

The radiation-attenuating element in accordance with the invention suitably has a purely rotationally symmetrical shape, but may also have a slightly different shape. The element may for example be slightly elliptical, the major axis of the ellispe extending in the logitudinal direction of the information tracks. This is what is meant by "substantially rotationally symmetrical".

The radiation-attenuating element may be a seperate element in the radiation path. However, a preferred embodiment of an apparatus in accordance with the invention is further charcterized in that the peripheral portion of the radiation-attenuating element is formed by a layer which is vacuum-deposited on an optical element. Seperate mounting and alignment of the radiation-attenuating element is then not necessary.

Suitably, the apparatus in accordance with the invention is characterized in that the thickness of the vacuum-deposited layer is some orders of magnitude smaller than the wavelength of the radiation beam. This ensures that the phase of the read beam remains substantially unaffected.

The apparatus in accordance with the invention may further be characterized in that the diameter of the central portion of the radiation-attenuating element is substantially half that of said element and the amplitude attenuation of the peripheral portion is within the range of approximately 40% to approximately 50%. An amplitude attenuation of approximately 40% will be used when reading a record carrier containing a video signal encoded in accordance with the so-called PAL standard, and an amplitude attenuation of approximately 50% for reading a record carrier containing a video signal encoded in accordance with the so-called N.T.S.C. standard.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
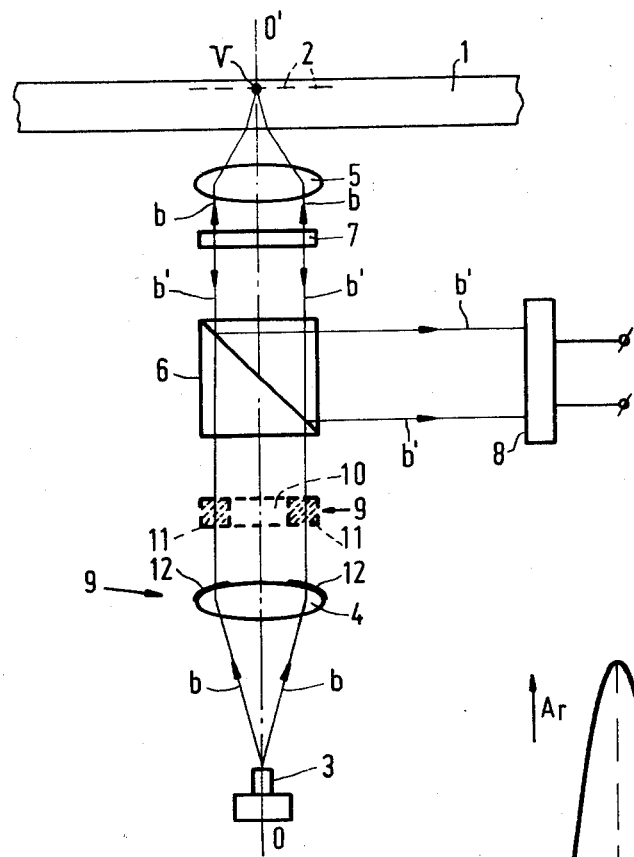
FIG. 1 shows an embodiment of a read apparatus equipped with a radiation-attenuating element.

FIG. 1 shows a small portion of a disk-shaped record carrier 1 in radial cross-section. The radiation-reflecting information structure is disposed on the upper side of the record carrier and comprises a multitude of information areas arranged along information tracks 2. The information structure is scanned by a read beam b produced by a radiation source 3, for example a semiconductor diode laser. A collimator lens 4 forms the diverging beam into a parallel beam of a cross-section such that the pupil of an objective system 5 is filled correctly. Said objective system then forms a radiation spot V of minimal dimensions on the information structure.

The read beam is reflected by the information structure as a beam b' and, as the record carrier moves relative to the read beam, the reflected beam is time-modulated in accordance with the information contained in the record carrier. In order to separate the modulated beam from the beam emitted by the radiation source a beam-splitting prism 6 is arranged between the radiation source and the objective system. In order to minimize the radiation loss in the read unit the use of a polarization-sensitive splitter prism is preferred. Between the objective system and the prism 6 a $\lambda/4$ plate 7 is arranged, $\lambda$ being the wavelength of the read beam b. Said prism is traversed twice by the read beam and rotates the plane of polarization of said beam through 90° in total. The beam emitted by the radiation source is almost entirely transmitted by the prism, while the modulated beam is almost entirely reflected, namely towards a radiation-sensitive detection system 8. Said system supplies a signal which is modulated in conformity with the information stored in the record carrier.

In order to enable a sufficient amount of information, for example a one-hour television programme, to be stored on one side of the record carrier at constant scanning speed, the information areas should be very small. The average length of the information areas is for example of the order of 1 $\mu$m or smaller and the width of the information areas, and hence of the information tracks, is for example approximately 0.6 $\mu$m. For a correct read-out of the information areas a sufficiently small read spot must be used.

The information structure may be regarded as a diffraction grating which splits the read beam into an undiffracted zero-order subbeam, a plurality of first-order subbeams, and a plurality of higher-order subbeams. For the information read-out mainly the subbeams which are diffracted in the track direction are of importance and of these subbeams mainly the first-order subbeams. If the read spot V is situated on an information area a substantial part of the radiation is diffracted beyond the pupil of the objective system 5 and reaches the detection system 8 with a minimal radiation intensity, so that the detector signal is minimal. If the radiation spot V is situated outside an information area almost all the radiation that is reflected is received by the objective system and the detector signal is maximum.

The read spot on the information structure is formed by an objective system 5 having a comparatively large numerical aperture, for example 0.5 in the case of an AlGaAs diode laser which emits radiation of a wavelength of 790 nm. The dimensions of and the intensity distribution in said spot are no longer determined by the laws of geometrical optics but solely by diffraction of the radiation at the aperture of the objective system 5.

Instead of a radiation spot with a sharp boundary within which the intensity is constant a radiation spot is formed which comprises a bright central portion and a number of rings which surround said portion and whose intensity is lower and decreases towards the periphery.

Figure 2:
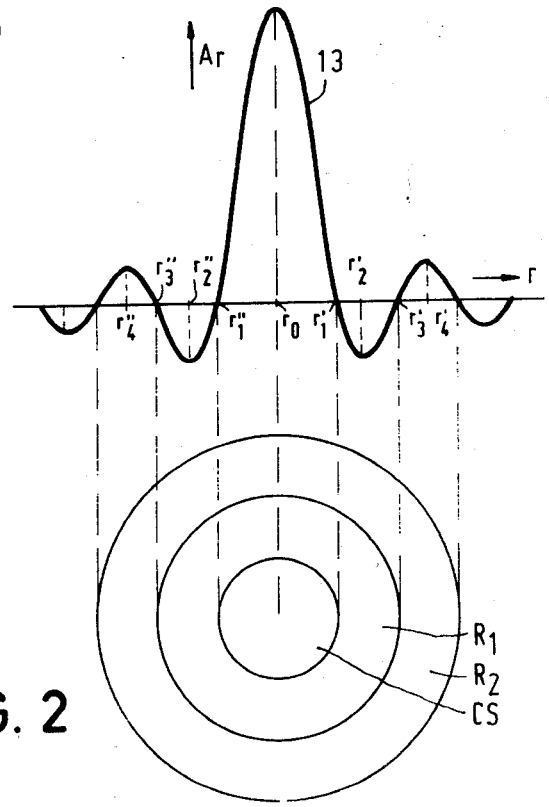
FIG. 2 represents the amplitude distribution in the radiation spot when the pupil of the objective system is filled homogeneously.

In FIG. 2 the curve 13 represents the variation of the relative amplitude $A_r$ within the radiation spot V as a function of the distance r from the optical axis for the case where the objective system is illuminated by a beam of homogenous intensity. The amplitude is maximum at point $r_o$, which coincides with the optical axis of the objective system and decreases at increasing value of /r/ to become zero at points $r_1'$ and $r_1''$. Further maxima are obtained at points $r_2'$, $r_2'$, $r_4'$ and $r_4''$ and further minima at points $r_3'$, $r_3''$ etc. The radiation spot V is represented in the lower part of FIG. 2. Said radiation spot comprises a central portion CS having an intensity which is comparatively high in the center and which decreases at increasing value of /r/, and a number of rings R1, R2, etc. whose intensity as a function of /r/ initially increases and subsequently decreases. The maximum in the ring $R_2$ is smaller than that in the ring $R_1$, which in its turn is smaller than the maximum intensity in the area CS.

The amplitude distribution represented in FIG. 2 is valid if the optical axis OO' in FIG. 1 of the objective system is perpendicular to the plane of the information structure. The cross-talk due to the (non zero) size of the read spot, as a result of which a part of the radiation which traverses the object system two times and which ultimately reaches the detection system is modulated by an adjacent information track, may then be minimized by ensuring that the centres of the adjacent information tracks are situated in points $r_3'$ and $r_3''$. In view of the information-track width, although small, and the tracking errors occurring during reading this poses a very difficult if not impossible practical problem. Moreover, no allowance is then made for obliquity of the record carrier during reading. Said obliquity gives rise to a so-called coma effect, which means that at one side, for example the right-hand side in FIG. 2, of the central portion, the intensity in the rings $R_1$ and $R_2$ increases and at the left-hand side the initial slope of the curve 13 becomes less steep. A larger portion of the radiation of the read beam b will then be incident on the information track situated near $r_3'$, so that the cross-talk from this information track increases.

Figure 3:
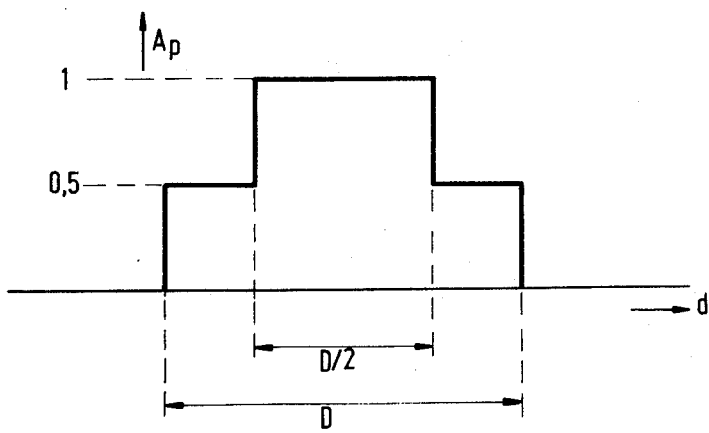
FIG. 3 represents the amplitude distribution of the entrance pupil of the objective system when the radiation-attenuating element is used and FIG. 4 represents the amplitude distribution in the radiation spot when the radiation-attenuating element is used.

According to the invention this cross-talk effect is reduced by reducing the amplitude and consequently the intensity, which is the square of the amplitude, in the ring $R_1$. For this purpose, as is shown in FIG. 1, a preferably rotationally symmetrical disc 9 is arranged in the radiation path. The disc 9 has a transmission characteristic such that the amplitude distribution Ap in the entrance pupil of the objective system 5 varies as represented in FIG. 3. In FIG. 3, D represents the diameter of said pupil. The disc 9 comprises a central portion 10 having a transmission coefficient equal to 1 and a ring 11 surrounding it and having a transmission coefficient between approximately 0.5 and approximately 0.6. The intensity in the outer ring of the pupil, the area for which $D/2 < d \leq D/2$, is then 25% to 36% of the intensity in the central portion of the pupil. When the disc 9 is present in the radiation path the relative amplitude Ar in the radiation spot varies as represented by the curve 14 in FIG. 4. The amplitude around points $r_2'$ and $r_2''$ where the maximum of the first ring was situated initially (compare FIG. 2) is substantially zero and the curve 14 is almost flat around said points. As a result of this the cross-talk from the information track situated near $r_2'$ with respect to the information track to be read is then minimal even when the record-carrier surface is disposed obliquely within specific limits.

The radiation-attenuating element 9 has an optimum effect if the transistion between the central portion and the peripheral portion is situated at half the diameter of said element. The position of said transition should not depart more than 0.05D from the optimum position (0.5D). The tolerances for the transmission coefficients of the central portion and the peripheral portion are wider.

Figure 4:
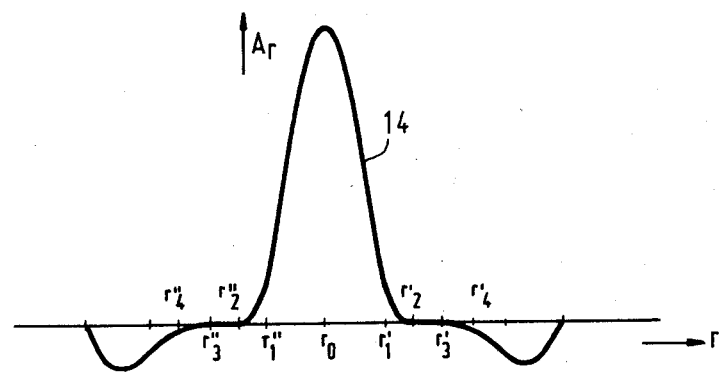

The element by means of which the amplitude distribution represented in FIG. 4 is obtained may be a seperate disc comprising a transparent central portion and a partly absorbing or reflecting edge portion. The edge portion is, for example, formed by a metallic layer (for example a chromiumnickel layer) which has been vacuum-deposited onto a substrate. Instead of on a seperate disc, the annular metallic layer 12 is suitably vacuum-deposited onto an element which is already present in the radiation path, for example the collimator lens 4 in FIG. 1. Then the radiation-attenuating element need not be mounted and aligned separately.

Said element should not significantly affect the phase of the read beam. Therefore the vacuum-deposited layer should be as thin as possible, suitably thinner than one hundredth of the wavelength of the read beam. Such a thin metallic layer can be formed in a satisfactory manner by means of conventional vacuum-deposition techniques. In order to prevent aging of the metallic layer the element may be coated with a protective coating, for example $SiO_2$, of constant thickness.

The invention is especially of advantage when reading an optical information structure by means of an AlGaAs diode laser. Because of the large wavelength, $\lambda = 790$ nm, of this laser an objective system having a large numerical aperture must be used. Since the coma as a result of obliquity of the record carrier is proportional to the third power of the numeral aperture, the cross-talk as a result of obliquity may be substantial. In an embodiment of a read apparatus comprising such a diode laser and in which the read spot is moved at constant speed relative to a record carrier containing a video programme the presence of the radiation-attenuating element makes it possible to comply with the requirement that for obliquity angles between $+1°$ and $-1°$ the cross-talk of the line-synchronizing pulses is smaller than $-31$ dB.

In the foregoing it has been assumed that the radiation beam has a uniform radiation intensity. A diode laser emits a beam of oblong cross-section and of different intensity distribution in two mutually perpendicular directions. It is possible to ensure that the collimator lens, 4 in FIG. 1, only receives a small central portion of the diode laser beam, so that the objective system is illuminated by a satisfactorily uniform beam. If it is desired to use a part of the radiation emitted by the laser which is as large as possible for reading the information structure, the read beam will then be non-uniform. In order to obtain an amplitude distribution as represented in FIG. 4 in the read spot, the transmission of the peripheral portion 11 or 12 of the radiation-attenuating element 9 may be adapted. Said peripheral portion then does not have a constant transmission coefficient, as is the case of uniform illumination of the objective pupil, but a varying transmission coefficient adapted to the amplitude distribution in the beam emitted by the laser.

The invention may also be employed in a read apparatus comprising a gas laser, for example a HeNe laser, as radiation source, if said apparatus is required to have a large optical bandwidth and consequently the objective system of said apparatus is required to have a large numeral aperture of the order of 0.5.

The invention has been described for an apparatus for reading a radiation-reflecting information structure, but may alternatively be employed in an apparatus for reading a radiation-transmitting information structure. Such apparatus does not comprise a beam-splitting prism 6 and a λ/4 plate 7. It is then necessary that between the record carrier and the detection system a second objective system is arranged, which suitably has the same numeral aperture as the objective system by means of which the information structure is illuminated.

A read apparatus in accordance with the invention may form part of an apparatus for optically recording information in a record carrier, the read apparatus being used for monitoring the information being recorded.

What is claimed is:

1. An apparatus for reading information from a record carrier having an information structure comprising a plurality of generally parallel information tracks, said apparatus comprising means for producing a beam of radiation, an optical system for projecting said beam onto said record carrier, said optical system including means for focusing said beam to a circular spot on an information track to be read so as to modulate the radiation of said beam in accordance with information stored in said track, and a radiation-sensitive detector disposed in the path of the modulated radiation, said optical system further including a substantially rotationally symmetrical radiation attenuating element arranged in the radiation path at a location which is traversed only by radiation which is traveling towards said record carrier, said attenuating element comprising a central portion and an annular peripheral portion such that there is an abrupt transition between said central and peripheral portions, said central portion transmitting the central portion of said beam substantially unattenuated and said peripheral portion providing substantial attenuation of the amplitude of the peripheral portion of said beam so as to reduce cross-talk due to assymmetry in the intensity distribution of the radiation incident on said information structure when said beam is not perpendicular to the surface of said record carrier.

2. An apparatus as claimed in claim 1, wherein the peripheral portion of the radiation-attenuating element is formed by a layer which is vacuum-deposited on an optical element of said optical system.

3. An apparatus as claimed in claim 1, wherein the thickness of the vacuum-deposited layer is some orders of magnitude smaller than the wavelength of the radiation beam.

4. An apparatus as claimed in claim 1, 2 or 3, wherein the diameter of the central portion of the radiation-attenuating element is substantially half that of said element and the amplitude attenuation of the peripheral portion is within the range of approximately 40% to approximately 50%.

* * * * *